UNITED STATES PATENT OFFICE.

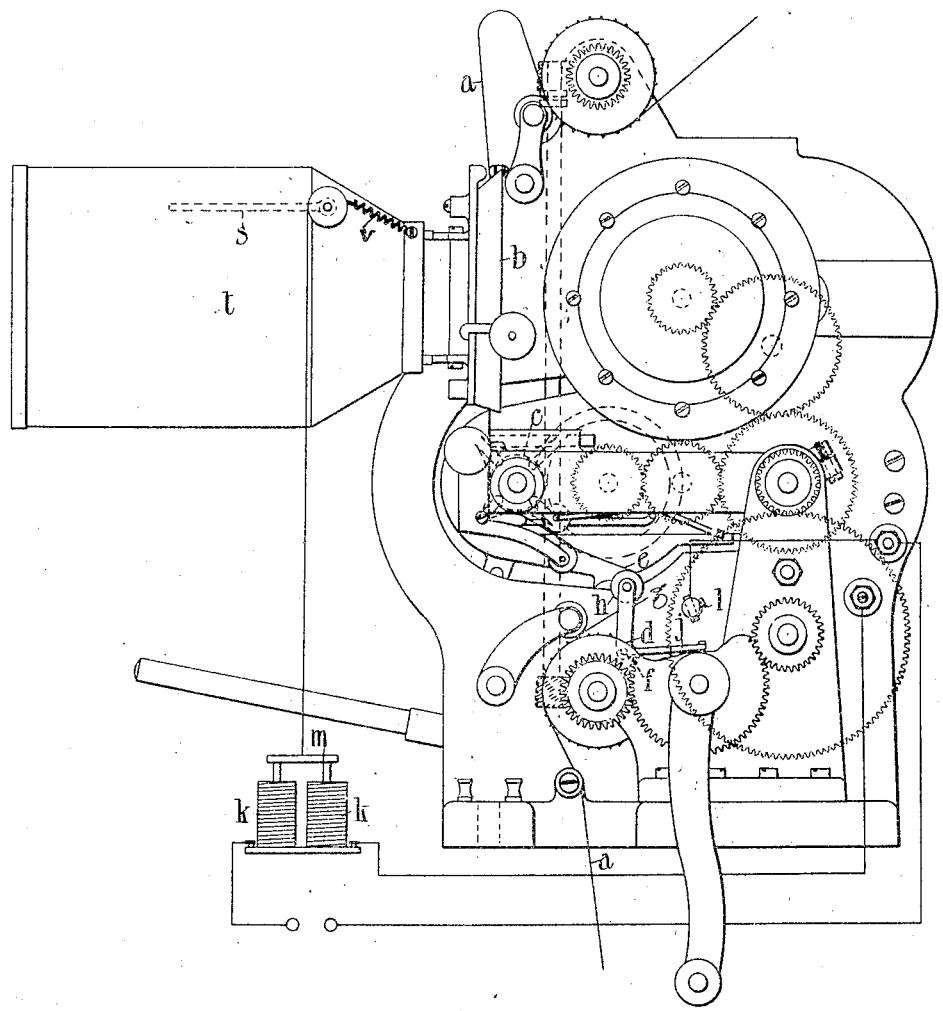

WALTER HILLIER ANDERSON, OF LONDON, ENGLAND.

CINEMATOGRAPHIC APPARATUS.

1,184,607.

Specification of Letters Patent.

Patented May 23, 1916.

Application filed September 11, 1914. Serial No. 861,234.

*To all whom it may concern:*

Be it known that I, WALTER HILLIER ANDERSON, a subject of the King of Great Britain and Ireland, and residing at Hampden Club, Phoenix street, London, N. W., England, have invented certain new and useful Improvements in and Relating to Cinematographic Apparatus, of which the following is a specification.

This invention relates to cinematographic apparatus and more particularly to the means for actuating the safety shutter.

As is well known the side edges of a film are perforated to engage the teeth of the draw-off and winding-on sprocket wheels which pass the film through the gate. As usually arranged there are two sprocket wheels arranged between the film gate and the winding-on spool, and between these wheels is left a slack portion of the film, the winding-on spool being operated by a friction drive. The perforations form weak places in the film and if it should happen that the space between several of the perforations be broken or the teeth of the draw-off sprocket fail to grip the film from any other cause, the feed of the film through the gate will cease until the winding-on sprocket takes up the aforementioned slack. The film is thus stopped in the gate and there is the danger of ignition.

The object of the present invention is to overcome this drawback, and it consists in an arrangement whereby should there be any tendency for the slack part of the film to tighten, the film will immediately actuate a switch member to operate a safety shutter and so cut off the light from the film.

The invention consists of the arrangement whereby when the slack of the film between the gate and the winding-on spool is tightened, the film actuates a lever whereby an electric circuit is closed, the armature of which actuates the safety shutter against the action of a spring, thereby cutting off the light from the lantern to the film.

One form of the invention is illustrated by way of example in the accompanying drawing, which is a diagrammatic elevation of a cinematograph apparatus showing the above mentioned improvements.

The film $a$ from the top or winding-off sprocket wheel passes through the gate $b$ around the lower or draw-off sprocket $c$ and from thence over the winding-on sprocket wheel $d$ to the spool. The leading on sprocket wheel and the two sprocket wheels $c$ and $d$ are geared with each other to give the same rate of speed of the film on their peripheries. When starting a film there is arranged between the draw-off sprocket wheel $c$ and the winding-on sprocket wheel $d$ a loop or slack portion of film $e$. Upon a stud $f$ suitably placed on the frame of the machine is pivoted a bell crank lever, one arm $g$ carrying a roller $h$ which bears against the film $e$, the other arm $j$ being adapted to close an electric circuit at $l$ when moved over by the roller $h$ being acted upon by the shortening of the loop or slack $e$ of the film. The electric circuit which is preferably derived from the same source of electric supply as that which drives the machine includes a double limb coil $k$ $k$ whose iron core $m$ acts by suitable means to close the shutter $s$ in the lantern tunnel $t$ and thus cut off the light from the film, the shutter being retained in the normal or open position by the tension of a spring $v$.

The operation is as follows:—When running normally the amount of slack in the film between the sprocket wheels $c$ and $d$ remains constant, but should the speed of the film through the gate $b$ drop owing to the sprocket wheel $c$ failing to grip the film the draw off sprocket wheel $d$ takes up the slack $e$ in the film which latter then engages the roller $h$ and rotates the bell crank lever on its fulcrum $f$, thus closing the electric contact at $l$ through the arm $j$. The closing of the electric circuit energizes the coil $k$ $k$, whose armature core $m$ which is connected with the safety shutter $s$ by means of a cord or the like is attracted in opposition to the spring $v$ whereby the shutter is closed and the light from the lantern is cut off from the film, and any risk of the latter igniting is thereby avoided. Instead of the bell crank lever operating to close an electric circuit, the movement of the arm may act to open a circuit already closed and thus close the safety shutter.

Having now described my invention what I claim as new and desire to secure by Letters Patent is:—

A cinematograph apparatus comprising a Maltese cross, a film sprocket integral thereto, a winding-on sprocket wheel, a lantern house tunnel, a safety shutter therein a spring which retains said shutter in the normal or open position and a film having a slack portion between the two sprocket wheels, the combination therewith of a bell crank lever, a roller on one arm operable by the tension of the film, an electric circuit with solenoid or the like and an armature for actuating the safety shutter, an insulated electric contact in said circuit whereby should the film sprockets fail to grip the film the other arm of the lever closes the electric circuit at the contact so that the solenoid attracts its armature thereby closing the shutter against the action of the spring.

In testimony whereof I have signed my name to this specification in the presence of two subscribing witnesses.

WALTER HILLIER ANDERSON.

Witnesses:
  E. E. PUTLAND,
  P. A. OUTHWAITE.